Nov. 3, 1931.   E. K. P. GRAHAM ET AL   1,830,511
CHANGE SPEED DEVICE
Filed Oct. 22, 1929
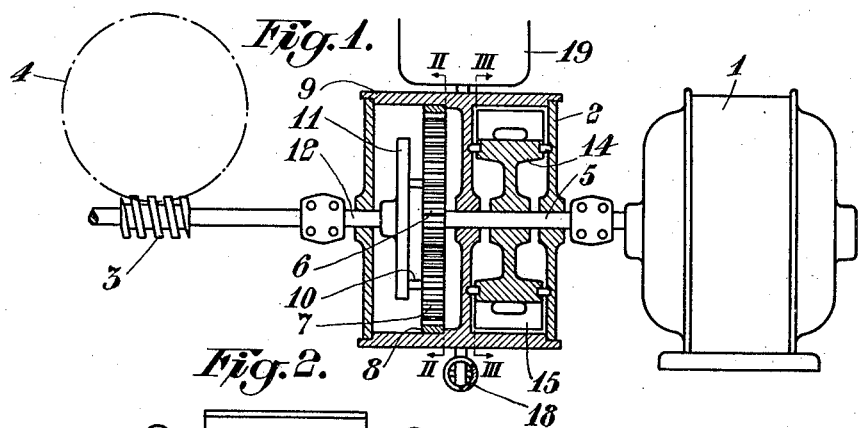
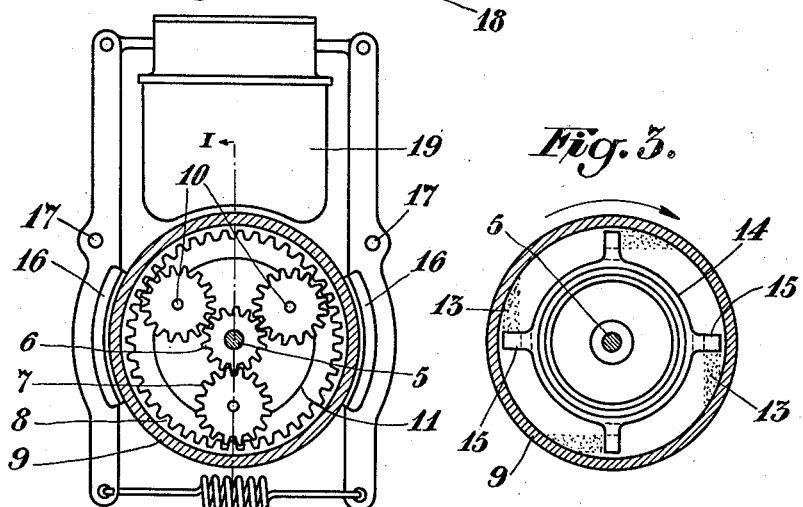
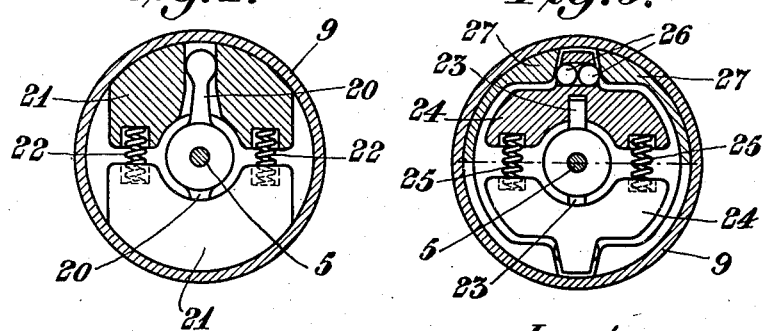
Inventors:
Edward Knut Patrik Graham
Sven Eskil Håkansson
by George Bayard Jones.
Attorney.

Patented Nov. 3, 1931

1,830,511

UNITED STATES PATENT OFFICE

EDWARD KNUT PATRIK GRAHAM, OF STOCKHOLM, AND SVEN ESKIL HÅKANSSON, OF ULRIKSDAL, SWEDEN, ASSIGNORS TO GRAHAM BROTHERS AKTIEBOLAG, OF STOCKHOLM, SWEDEN, A COMPANY OF SWEDEN

CHANGE SPEED DEVICE

Application filed October 22, 1929, Serial No. 401,538, and in Sweden November 3, 1928.

In elevators, and particularly such elevators which are run at a high speed, and which are adapted to transport trucks which it shall be possible to run into and out of the elevator car at the floors, it is often necessary to first considerably reduce the speed of the car when it approaches a floor in order that afterwards it shall be possible to stop the car in the desired accurate position at the floor in question. In order to render possible the great speed variations necessary for this purpose, resort has either been taken to direct current motors with excessive adjustment of the field strength, or to alternating current motors which are provided with a changeable number of poles, or are electrically controllable in other manner, or the elevator machinery has been provided with auxiliary aggregates which are coupled to the machinery in a mechanical or electrical way. In such cases the electrical equipment has consisted of two or three motor or generator units and a voluminous apparatus equipment for the same, particularly in the case of automatic operation. All these expedients, therefore, entail a considerable complication and increased cost of the elevator machinery.

Now, the present invention relates to a simple and inexpensive change speed device by means of which the ordinary elevator motor, which in this case need not be built for adjustment of the field strength, change of pole numbers, or the like, can operate both as a normal elevator motor when the elevator car runs at a normal rate of speed, and as an adjustment motor for the accurate adjustment of the elevator car at the floors.

The change speed device, which is provided in a manner known per se wi h a planetary gear or the like with associate rotatably mounted gear case which can be prevented from rotating by means of a suitable brake device, is principally characterized by interposing between two members of the planetary gear which are movable relatively to each other when the planetary gear is functioning, a centrifugal clutch the coupling pressure of which is automatically changed upon a change of the number of revolutions, in such manner that when the gear case is not held stationary by the brake, the change speed device acts as a direct clutch, but when the gear case is stationary, it effects a change of the number of revolutions. This change speed device may be used not only for elevators, as it may also be used with advantage in other cases where it is desired to make it possible to change the normal number of revolutions and normal torque of the driving motor to a lower number of revolutions and a greater torque, as for instance in swinging bridges and rolling bridges which must be started with a great torque and which must be cautiously adjusted in position at a decreased speed, and when starting machines which offer a very high frictional resistance when at rest, such as printing machines and so forth.

In the accompanying drawings a few embodiments of the invention are illustrated by way of example. Fig. 1 shows a change speed device according to the invention coupled to an elevator motor, the device being shown in longitudinal section on the line I—I in Fig. 2. Fig. 2 is a cross section on the line II—II in Fig. 1, and Fig. 3 is a cross section on the line III—III in Fig. 1. Figs. 4 and 5 shows cross sections of two modified embodiments of the centrifugal clutch of the change speed device.

Referring to the embodiment illustrated in Figs. 1, 2, and 3, 1 denotes an electric motor, for instance an elevator motor, 2 denotes the change speed device, and 3, 4 denotes a screw gearing by means of which the motion is transmittted, for instance, to the rope drum of the elevator which is not illustrated in the drawings. The change speed device consists of a planetary gear having a sun wheel 6 secured to the driving shaft 5 and meshing with three planet wheels 7, which in their turn mesh with an internal gear 8 on the inside of the rotatably mounted gear case 9, the shafts 10 of said planet wheels being carried by a disk 11 which is secured to the driven shaft 12. and of a centrifugal clutch which in the embodiment illustrated is of the so-called "Pulvis" type. The driving member of this clutch consists of a suitable quantity of powder 13 placed in the space between a drum 14 secured to the driving shaft 5, and the gear case 9, which latter forms the driven member of the clutch.

The drum 14 is provided in a well-known manner with a number of wings 15 which serve to entrain the said powder during the rotation of the drum, the quantity and specific gravity of said powder being chosen to suit the torque which it is desired to transmit at given numbers of revolutions. In order to brake and hold the gear case 9 stationary there are provided two brake shoes 16 which are pivotally mounted on fixed pivots 17, and which are actuated by a strong coil spring 18 which tends to force the brake shoes against the gear case 9 so as to prevent the same from rotating, and also by an electromagnet 19 by the energization of which the brake shoes may be moved apart so that the gear case 9 is released and becomes free to rotate about the common geometrical axis of the shafts 5 and 12.

When the change speed device is used with an elevator, as in the embodiment illustrated, it functions in the following manner. When the motor 1 is started, the shaft 5 with the drum 14 of the cenrifugal clutch and the sun wheel 6 are rotated. The movement of the sun wheel is transmitted to the planet wheels 7 which roll against the internal gear 8 on the inside of the gear case 9 which is braked and held stationary. Consequently, the disk 11 is caused to rotate with a less speed than the shaft 5, and the movement of the disk is transmitted through the shaft 12 and the screw gearing 3, 4 to the rope drum of the elevator, so that the elevator is started at a slow speed.

Now, if the pressure of the brake shoes 16 against the gear case 9 is sufficiently reduced or entirely relieved by supplying current to the electromagnet 19, the gear case 9 will be entrained in the rotation of the driving shaft 5 owing to the turning moment transmitted to the same by the driving member 13, 14, 15 of the centrifugal clutch. The change speed device now acts as a direct coupling, so that the disk 11 and shaft 12 are caused to rotate with the same speed as the shaft 5, and the elevator runs with its normal speed.

When the elevator car approaches the floor at which it is to stop, the normal speed shall be reduced to the lower speed, the so-called adjustment speed. This is effected by gradually reducing and finally breaking the current through the electromagnet 19, whereby the spring 18 forces the brake shoes 16 against the gear case 9 with a gradually increased pressure, until the movement of the gear case stops. The planetary gear 6, 7, 8 is then again caused to function, so that the shaft 12 is rotated at a less speed than the shaft 5. The elevator car can therefore easily be stopped in the desired accurate position at the floor in question.

In order to obtain a silent operation of the planetary gear, as well as little wear of and small consumption of energy in the centrifugal clutch, it is suitable to let the motor 1 run at a somewhat reduced number of revolutions when the gear case 9 is braked and stationary and thus the planetary gear 6, 7, 8 is functioning.

In view of the inherent regulating qualities of the centrifugal clutch, the regulation of the number of revolutions of the motor required for this purpose may be effected by means of simple resistances in series with the armature of direct current motors, or in series with the stator or the rotor in alternating current motors. Complicated and expensive motors designed for adjustment of the field strength or for changing the number of poles are thus not required for this purpose.

By constructing the clutch as a centrifugal clutch the result is obtained that the torque transmitted by the clutch is increased with an increase of the number of revolutions. This fact acts to a certain extent to regulate the number of revolutions of the motor, since an increase of the number of revolutions produces an increase of the load on the motor, and a decrease of the number of revolutions produces a decrease of said load, and furthermore, at the full number of revolutions of the motor full torque can be obtained, while at lower numbers of revolutions of the motor only inconsiderably more work need be produced by the same than that required for rotating the sun wheel 6.

According to the modified construction of the centrifugal clutch illustrated in Fig. 4, said clutch consists of two arms 20 secured to the driving shaft 5, which arms engage two centrifugal weights 21 and entrain the same upon rotation of the shaft. During the rotation of the shaft 5 said weights are forced by centrifugal action against the driven member of the clutch, which also in this case consists of the gear case 9.

When the device is at rest the weights 21 are forced by two compression springs 22 inserted between the same against the gear case 9 with a certain initial pressure. By suitable dimensioning of the weights 21 and of the pressure of the springs 22 the torque which the clutch can transmit at rest or at certain numbers of revolutions, may be regulated as desired within wide limits. Again, if the springs 22 are made as tension springs which, at rest or at low numbers of revolutions, hold the weights 21 at a distance from the gear case 9, the torque of the clutch may be entirely suspended during conditions of rest or slow speed.

Finally, Fig. 5 shows an embodiment of the clutch which is adapted to transmit a torque which is controlled by the centrifugal force, and which is very great also at a low number of revolutions. The arms 23 secured to the driving shaft 5 entrain two centrifugal weights 24 which press against balls or rollers 26 placed in recesses in the weights, with a force which is the resultant of the action of the centrifugal force on the weights and the pressure of the compression springs 25 interposed between the weights. Said balls or rollers tend to move up on inclined planes at the ends of the friction shoes 27, so that said shoes are pressed with a great force against the driven member 9 of the clutch. If the springs 25 consist of tension springs the torque of the clutch can also in this case be wholly suspended at rest and at low numbers of revolutions.

The described change speed device may of course also be made in such manner that its function will be the reverse to that above described. The centrifugal clutch may, for instance, be made in such manner that the torque transmitted by the same is decreased with an increase in the number of revolutions, and the device may also be made in such manner that the planetary gear produces an increase of the number of revolutions of the motor when the gear case 9 is braked and held stationary.

We claim:

1. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between said driving shaft and a member of said planetary gear which is movable relatively to said driving shaft when said gear is functioning, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said driving shaft and said planetary gear member so that the change speed device acts as a direct coupling.

2. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between two members of said planetary gear which are movable relatively to each other when said gear is functioning, said centrifugal friction clutch having one member connected with one of said planetary gear members, another member connected with the other of said planetary gear members, and means actuating said clutch members to engage each other with a certain coupling pressure also when said clutch is at rest, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said members of said planetary gear so that the change speed device acts as a direct coupling.

3. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between said driving shaft and a member of said planetary gear which is movable relatively to said driving shaft when said gear is functioning, said centrifugal friction clutch having one member connected with said planetary gear member, another member connected with said driving shaft, and means actuating said clutch members to engage each other with a certain coupling pressure also when said clutch is at rest, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said driving shaft and said planetary gear member so that the change speed device acts as a direct coupling.

4. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between two members of said planetary gear which are movable relatively to each other when said gear is functioning, said centrifugal friction clutch having one member connected with one of said planetary gear members, another member connected with the other of said planetary gear members, and a spring actuating said clutch members to engage each other with a certain coupling pressure also when said clutch is at rest, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said members of said planetary gear so that the change speed device acts as a direct coupling.

5. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between said driving shaft and a member of said planetary gear which is movable relatively to said driving shaft when said gear is functioning, said centrifugal friction clutch having one member connected with said planetary gear member, another member connected with said driving shaft, and a spring actuating said clutch members to engage each other with a certain coupling pressure also when said clutch is at rest, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said driving shaft and said planetary gear member so that the change speed device acts as a direct coupling.

6. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between two members of said planetary gear which are movable relatively to each other when said gear is functioning, said centrifugal friction clutch comprising a brake drum connected with one of said planetary gear members, brake shoes within said brake drum, said brake shoes having inclined planes, rollers adapted to cooperate with said inclined planes on said brake shoes, centrifugal weights connected with the other of said planetary gear members and adapted to cooperate with said rollers, and springs actuating said weights to force said rollers to roll on said inclined planes so as to force said brake shoes to engage said brake drum with a certain coupling pressure also when said clutch is at rest, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said members of said planetary gear so that the change speed device acts as a direct coupling.

7. In a change speed device, the combination of a driving shaft, a driven shaft, a planetary gear between said driving shaft and said driven shaft, a rotatably mounted gear case in said planetary gear, a brake device adapted to hold said gear case against rotation while said driving shaft is rotating, and a centrifugal friction clutch interposed between said driving shaft and a member of said planetary gear which is movable relatively to said driving shaft when said gear is functioning, said centrifugal friction clutch comprising a brake drum connected with said planetary gear member, brake shoes within said brake drum, said brake shoes having inclined planes, rollers adapted to cooperate with said inclined planes on said brake shoes, centrifugal weights connected with said driving shaft and adapted to cooperate with said rollers, and springs actuating said weights to force said rollers to roll on said inclined planes so as to force said brake shoes to engage said brake drum with a certain coupling pressure also when said clutch is at rest, said centrifugal friction clutch being adapted automatically to change its coupling pressure upon a change of the number of revolutions of said driving shaft in such manner that when said brake device is functioning and holds said gear case against rotation while said driving shaft is rotating said planetary gear effects a change of the number of revolutions whereas when said brake device is not functioning and is not holding said gear case against rotation while said driving shaft is rotating said centrifugal friction clutch locks said driving shaft and said planetary gear member so that the change speed device acts as a direct coupling.

EDWARD KNUT PATRIK GRAHAM.
SVEN ESKIL HÅKANSSON.